US007304801B2

(12) United States Patent
Wang et al.

(10) Patent No.: US 7,304,801 B2
(45) Date of Patent: Dec. 4, 2007

(54) DISTRIBUTED BRAGG REFLECTOR SYSTEMS AND METHODS

(75) Inventors: Yao Rong Wang, Webster, NY (US); Joel A Kubby, Santa Cruz, CA (US)

(73) Assignee: Xerox Corporation, Stamford, CT (US)

( * ) Notice: Subject to any disclaimer, the term of this patent is extended or adjusted under 35 U.S.C. 154(b) by 310 days.

(21) Appl. No.: 11/092,835

(22) Filed: Mar. 30, 2005

(65) Prior Publication Data

US 2006/0221450 A1 Oct. 5, 2006

(51) Int. Cl.
*G02B 1/10* (2006.01)

(52) U.S. Cl. ...................................... 359/584; 359/589

(58) Field of Classification Search ................ 359/584, 359/588, 589

See application file for complete search history.

(56) References Cited

U.S. PATENT DOCUMENTS

2002/0163952 A1* 11/2002 Hwang et al. ................ 372/96

* cited by examiner

*Primary Examiner*—Fayez G. Assaf
(74) *Attorney, Agent, or Firm*—Oliff & Berridge, PLC

(57) ABSTRACT

A distributed Bragg reflector includes a first layer formed to be a first thickness, and a second layer formed to be a second thickness. A method of forming a distributed Bragg reflector includes forming a first layer to be a first thickness and forming a second layer to be a second thickness. The first and second thicknesses are determined using a wavelength that is adjacent to a center wavelength of an optical band of the distributed Bragg reflector.

20 Claims, 9 Drawing Sheets

DISTRIBUTED BRAGG REFLECTOR SYSTEMS AND METHODS

BACKGROUND

1. Field of Invention

Distributed Bragg reflector (DBR) systems and methods that may be used with micro-electromechanical (MEMS) devices.

2. Description of Related Art

In xerographic color printing applications, it is desirable to have systems that measure the color accuracy of the printing. For example, spectrophotometers may be used with color printers to perform color sensing and measurement. Spectrophotometers may also be used for color sensing and measurement in xerography.

A spectrophotometer having a Fabry-Perot cavity filter may be integrated with a silicon photodetector, and then an optical fiber may be used for inputting light vertically to sense the color. The Fabry-Perot cavity thickness may be tuned electrostatically to resolve the spectral distribution of the transmitted light signal. A charge drive mode may be used to tune the Fabry-Perot cavity filter to avoid electrostatic instability that results from using a voltage drive mode. This configuration provides better linearity than the voltage drive mode.

Distributed Bragg reflectors (DBR) are widely used for enhancing the performance of optoelectronic devices such as light emitting devices, spectrophotometers, modulators and photodetectors. For example, a DBR may be used to increase the reflectivity, e.g., resolution, of a MEMS based full width array Fabry-Perot spectrophotometer that can be used for in-line xerographic color measurement. For some DBR applications, the number of DBR layers is limited due to economical considerations such as fabrication costs.

When forming DBRs, the thickness of each layer of the DBR must be determined. A high reflectance that is uniform over the optical band of the DBR is desired. In order to obtain the uniform high reflectance over the optical band, the thickness of each layer of the DBR may determined by using $\lambda_0/4n$, where $\lambda_0$ is the center wavelength of the optical band and n is the optical refraction index of the layer material. While using this method may enhance the reflectance of the DBR near $\lambda_0$, the reflectance away from $\lambda_0$, e.g., a wavelength that is adjacent to the center wavelength may not be enhanced to a desired level.

SUMMARY

Based on the problems discussed above, there is a need for distributed Bragg reflector systems and methods that have a uniform high reflectance over an optical band.

A distributed Bragg reflector includes a first layer formed to be a first thickness, and a second layer formed to be a second thickness. A method of forming a distributed Bragg reflector includes forming a first layer to be a first thickness and forming a second layer to be a second thickness. The first and second thicknesses are determined using a wavelength that is adjacent to a center wavelength of an optical band of the distributed Bragg reflector.

The DBR may be used in spectrophotometers, photodetectors, tunable lasers, tunable semiconductor light-emitting-diodes and/or tunable organic light-emitting-diodes.

The DBR of a semiconductor photodetector may be formed to have its reflectivity increased uniformly to improve the performance of the photodetector. Moreover, the DBR of a light-emitting diode may be formed to increase the electroluminescence, thus increasing the performance of the light-emitting diode.

DBRs may be used as spectral filters with a high reflectance and narrow wavelength range. However, by optimizing the thickness of the layer pairs of the DBR, the reflectivity for a band of wavelengths may be improved. For example, the thickness of each layer in a one-pair, two-pair or three-pair Si—$SiO_2$ DBR may be optimized for the optical band at approximately 400 nm-700 nm.

BRIEF DESCRIPTION OF THE DRAWINGS

Various exemplary embodiments of the systems and methods will be described in detail, with reference to the following figures, wherein.

DETAILED DESCRIPTION OF EMBODIMENTS

The distributed Bragg reflector (DBR) systems and methods discussed below may be used with micro-electromechanical (MEMS) devices. For reasons of convenience, the DBR systems and methods discussed below are used in a spectrophotometer. However, it should be appreciated that the DBR systems and methods may be used, for example, in photodetectors, tunable lasers, tunable semiconductor light-emitting-diodes, tunable organic light-emitting-diodes or any other device that uses DBRs without departing from the spirit and scope of the disclosure.

Figure 1:
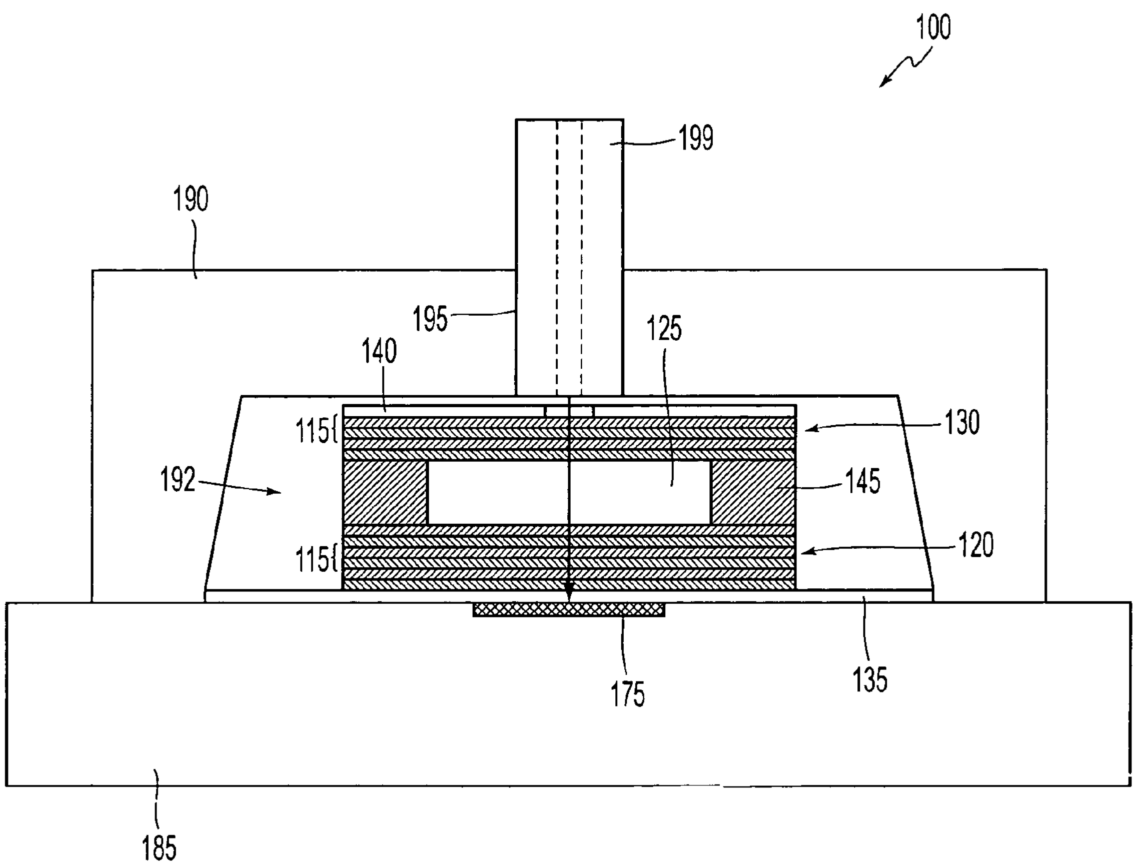
FIG. 1 is an exemplary diagram of a spectrophotometer.

FIG. 1 is an exemplary diagram showing a spectrophotometer 100. The spectrophotometer 100 may include a substrate 185 with a photodetector 175, which may be a p-i-n photodiode. The spectrophotometer 100 may include a silicon wafer 190 with a recess 192 etched in the silicon wafer 190. Lithographic patterning may be performed prior to etching a circular hole 195. The size of the circular hole 195 may be determined by matching the diameter of an optical fiber 199. A Fabry-Perot cavity filter 110 may be used which may include three pairs of quarter wavelength Si/SiN-.sub.x stacks 115 used as a bottom distributed Bragg reflector (DBR) 120, an air gap cavity 125 and two pairs of quarter wavelength Si/SiN.sub.x stacks 115 used as a top DBR 130. Indium tin oxide (ITO) may be used to form a transparent bottom electrode 135 and a transparent top electrode 140.

The top DBR 130 may be deformed to change the height of air gap cavity 125 by applying a voltage in the range of 100 volts across the transparent bottom electrode 135 and the transparent top electrode 140, or a charge in the range of 10.sup.-11 coulombs on the transparent bottom electrode 135 and the transparent top electrode 140 to effect a change in the height of air gap cavity 125 of about 300 to 500 nm. The electrodes 135 and 140 form a capacitor. The Fabry Perot cavity filter 110 may have an associated capacitance. As the height of air gap cavity 125 decreases, the Fabry-Perot transmission peak shifts to shorter wavelengths where the air gap cavity 125 height decreases to the left.

Figure 2:
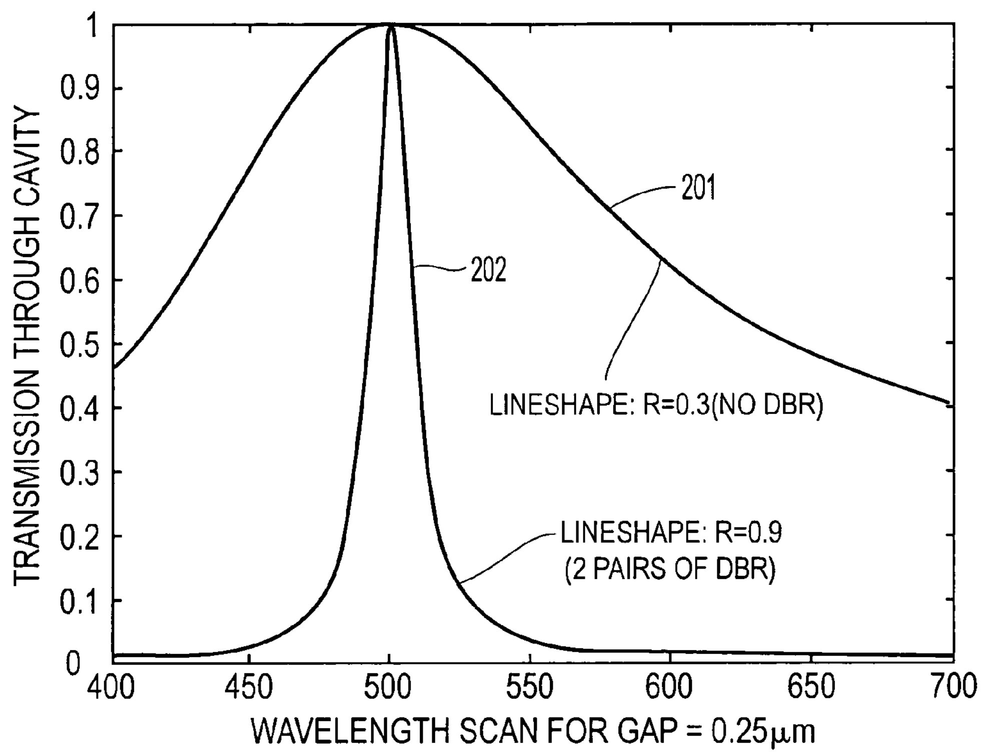
FIG. 2 is an exemplary diagram comparing reflectivity results of a device with a DBR and a device without a DBR.

FIG. 2 is an exemplary diagram comparing reflectivity results of a device with a DBR and without a DBR. In many optoelectronic applications, performance of a device is critically dependent on optical reflectivity. For example, the spectrophotometer 100 based on the Fabry-Parot cavity discussed above (the reflectivity between silicon and air is about 0.3) and no DBR results in a transmission through the cavity (reflectivity) as shown in line 201 of FIG. 2. The broad shape of the line 201 will result in low resolution for the spectrophotometer 100. However, incorporating a DBR into the spectrophotometer 100 may increase the reflectivity of the device. For example, if a DBR is used to increase the reflectivity to 0.9, the full spectral line width of the reflectivity may be reduced to about a 10 nm band, as shown in the line 202 in FIG. 2. The reflectivity of 0.9 and the 10 nm band will satisfy the requirements for most color spectrophotometers.

Figure 3:
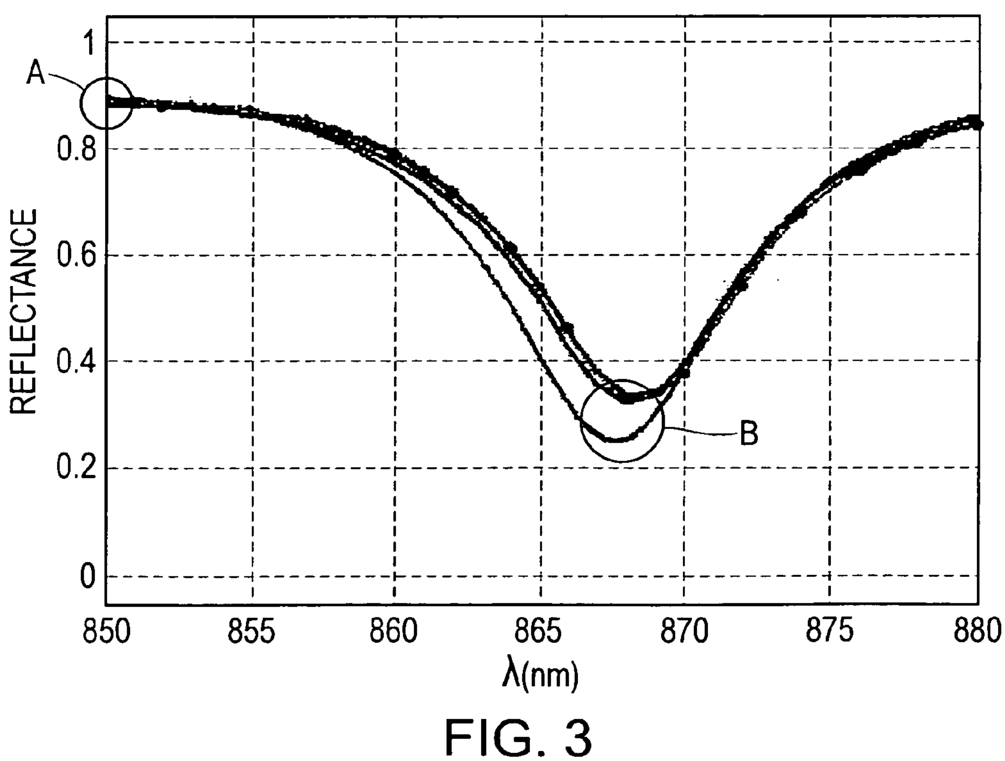
FIG. 3 is an exemplary diagram showing reflectivity results from testing a two-pair Si—$SiO_2$ DBR.

FIG. 3 is an exemplary diagram showing reflectivity results from testing a two-pair Si—$SiO_2$ DBR. The DBR may be formed to include a set a layers with alternating high and low refraction indices because the different materials provide a good optical contrast. For example, the layers of the DBR may be formed of Si and $SiO_2$. Si has a refractive index of about 3.5, and $SiO_2$ has a refractive index of about 1.45. The thickness of the layers of the two-pair Si—$SiO_2$ DBR may be controlled precisely using the Maxwell's equation for the DBR. Specifically, the thickness $l_i$ of each DBR layer i may be determined by its refractive index $n_i$ and the center wavelength $\lambda_0$ as:

$$l_i=\lambda_0/4n_i \qquad \text{Eq. (1)}$$

FIG. 3 shows data obtained from testing the two-pair Si—$SiO_2$ DBR on a Si substrate where the layer thickness is determined using Eq. (1). The thickness of each layer in the DBR may be determined using the center wavelength $\lambda_0$ of about 850 nm at point A in FIG. 3 to achieve a high refractive index of over 0.8. Although high reflectance at 850 nm is acceptable, the reflectance near 868 nm in not acceptable as shown at point B of FIG. 3. In fact, the reflectance at point B in FIG. 3 will likely cause problems in some devices such as the spectrophotometer.

It should be appreciated that additional materials besides Si and $SiO_2$ may be used to form the DBR layers without departing from the spirit and scope of the disclosure. For example, the DBR layers may be formed of GaAs and AlAs, or polysilicon and silicon nitride $Si_3N_4$. If these materials are used to form the DBR layers, more layers may be required to form the DBR if the index contrast is less than the index contrast obtained when using Si and $SiO_2$.

Figure 4:
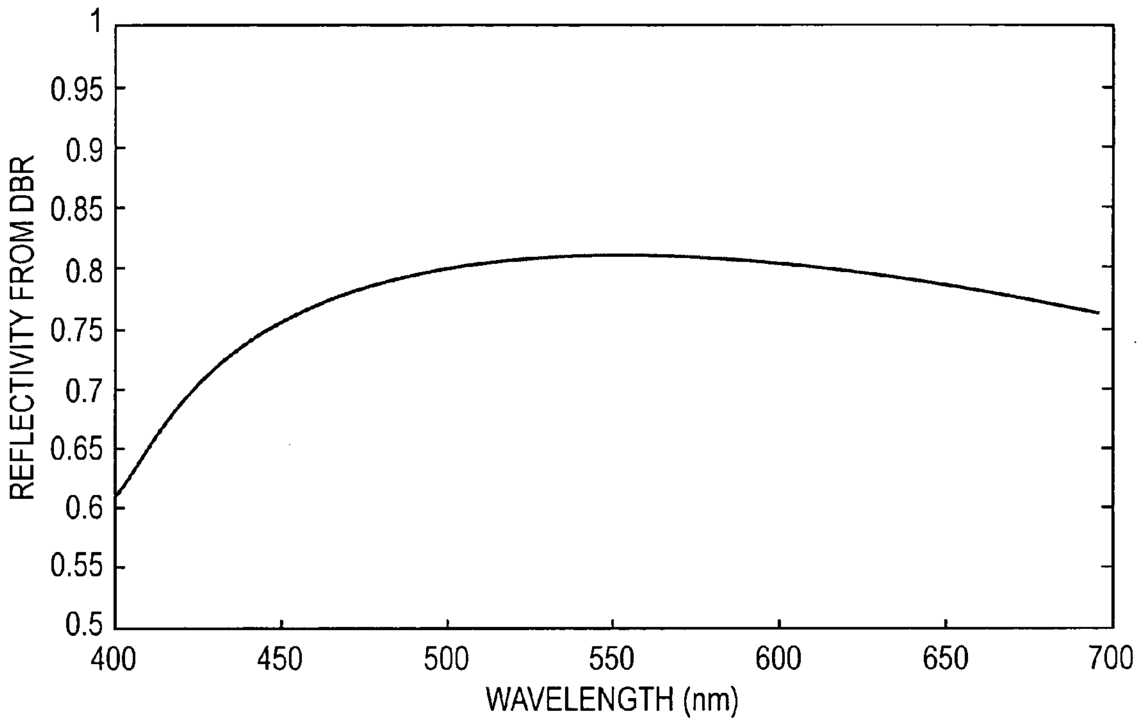
FIG. 4 shows an exemplary diagram of reflectivity results when a DBR includes one-pair Si—$SiO_2$ layers with layer thickness determined by $\lambda_0/4n$.

FIG. 4 is an exemplary diagram showing reflectivity results when a DBR includes one-pair of Si—$SiO_2$ layers with layer thickness determined in accordance with Eq. (1). It should be appreciated that the discussion below uses an optical band of 400 nm to 700 nm for exemplary purposes only, and that any band may be used without departing from the spirit and scope. As shown in FIG. 4, the center wavelength $\lambda_0$ for the optical band 400 nm to 700 nm is 550 nm. The refractive index $n_i$ used in Eq. (1) for Si is 3.42 and the refractive index $n_i$ used for $SiO_2$ is 1.45. As a result, the thickness of the Si layer of the DBR is 40.2 nm and the thickness for the $SiO_2$ layer is 94.8 nm. As discussed above, the performance of a device such as a spectrophotometer is critically dependent on optical reflectivity, e.g., a uniform and high reflectance. The reflectance shown in FIG. 4 is lower near 400 nm-450 nm, which is non-uniform and unacceptable. This problem exists because the formation of the layers using Eq. (1) only considers reflectance at a single wavelength, e.g., 550 nm. However, the uniformity of the reflectance may be improved throughout the optical band by altering the thickness of each layer of the DBR based on different wavelengths that are not centered within the 400 nm to 700 nm optical band.

Figure 5:
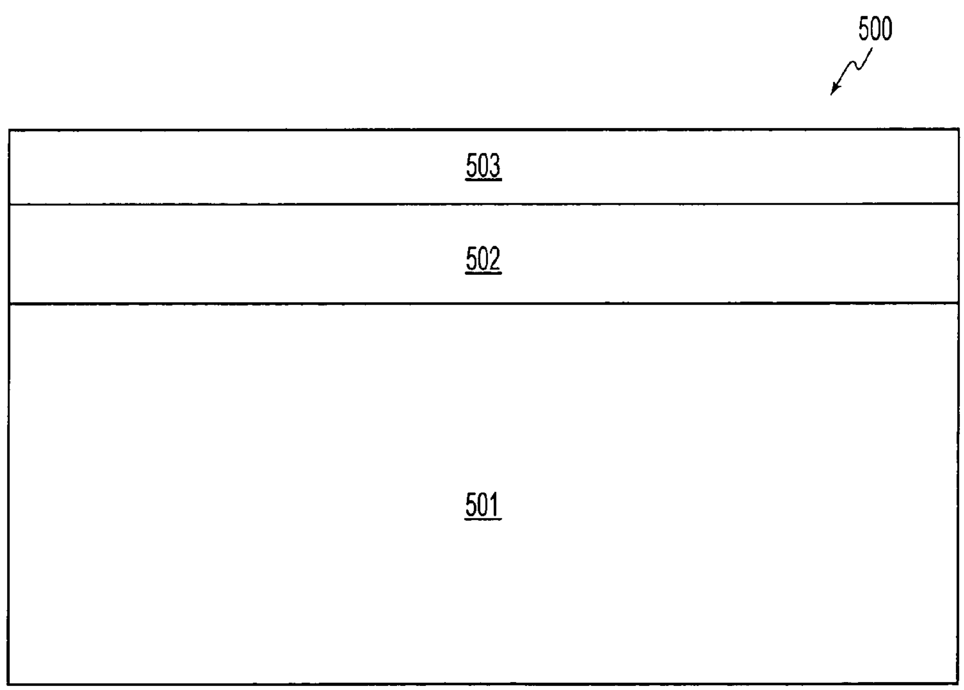
FIG. 5 shows an exemplary diagram of a DBR that includes one-pair Si—$SiO_2$ layers with layer thickness varied from $\lambda_0/4n$.

FIG. 5 is an exemplary diagram showing a DBR 500 that includes one-pair Si—$SiO_2$ layers with varied layer thickness, and uses a wavelength $\lambda_a$ that is not centered within the optical band of 400 nm-700 nm. The Si—$SiO_2$ layers are formed on a substrate 501. By varying the thickness of the layers used in FIG. 4, the reflectance becomes more uniform. As shown in FIG. 5, (when $\lambda_a$=approximately 510 nm), the Si layer 503 may be formed to be 37.3 nm thick and the $SiO_2$ layer 502 formed to be 87.9 nm thick. Because the Si refractive index may vary, the thickness of each layer may include a tolerance. For example, the thickness of the Si layer 503 may be 37.3 nm±2 nm, and the thickness of the $SiO_2$ layer 502 may be 87.9±1 nm. Thus, the layer thickness of each layer may be determined by:

$$l_i=\lambda_a/4n_i \qquad \text{Eq. (2)}$$

Figure 6:
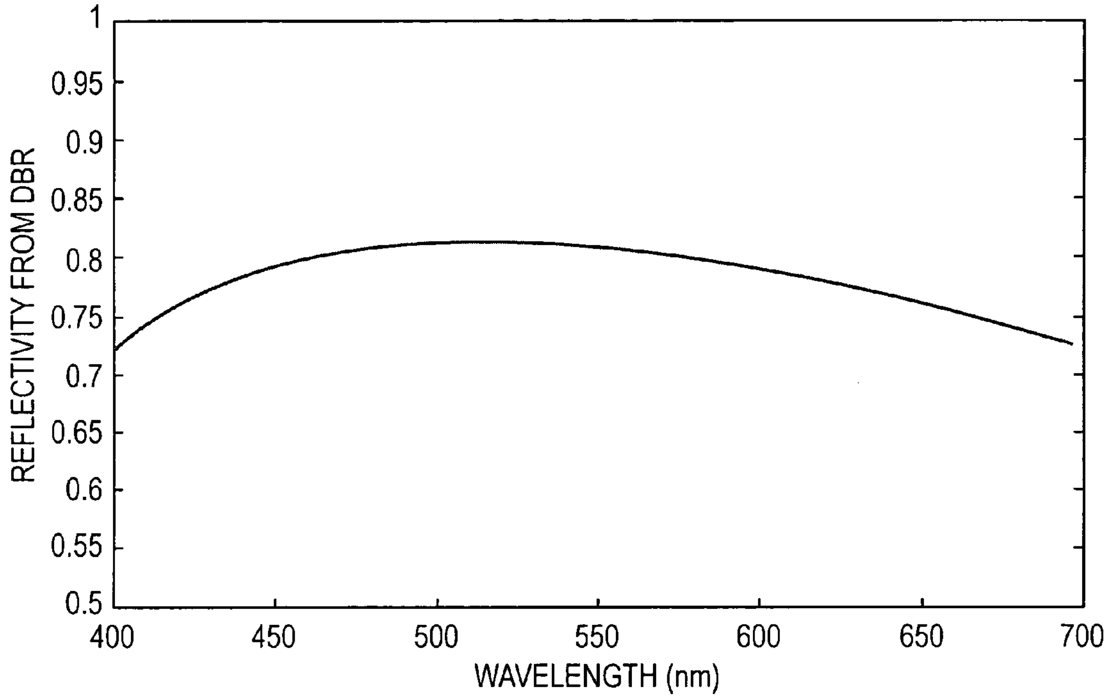
FIG. 6 shows an exemplary diagram of reflectivity results of the one-pair DBR in FIG. 5.

FIG. 6 is an exemplary diagram showing reflectivity results using the one-pair DBR shown in FIG. 5. As shown in FIG. 6, uniform reflectance is significantly improved throughout the 400 nm-700 nm band, and the low reflectance shown in FIG. 4 near 400 nm-450 nm no longer exists.

Figure 7:
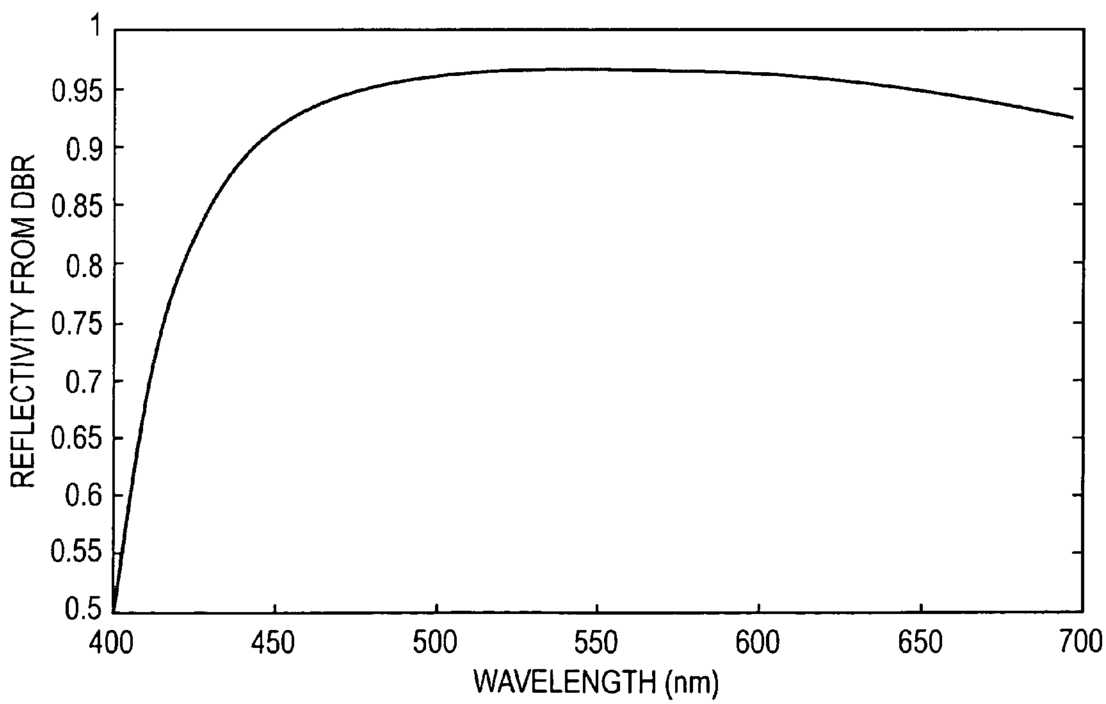
FIG. 7 shows an exemplary diagram of the reflectivity results when the DBR includes two-pair Si—$SiO_2$ layers with layer thickness determined by $\lambda_0/4n$.

FIG. 7 is an exemplary diagram showing the reflectivity results when the DBR includes two-pair Si—$SiO_2$ layers in accordance with Eq. (1) without varied layer thickness, and using a centered wavelength λ=550 nm. Using the refractive index $n_i$ of 3.42 for Si and the refractive index $n_i$ of 1.45 for $SiO_2$, the two Si layers of the DBR may be formed to each be 40.2 nm thick and the two $SiO_2$ layers of the DBR may be formed to each be 94.8 nm thick. As a result, the reflectance shown in FIG. 7 is again lower near 400 nm-450 nm, which is non-uniform and unacceptable. However, the thickness of the four layers of Si and SiO2 may be altered to improve the uniformity of the reflectance throughout the optical band.

Figure 8:
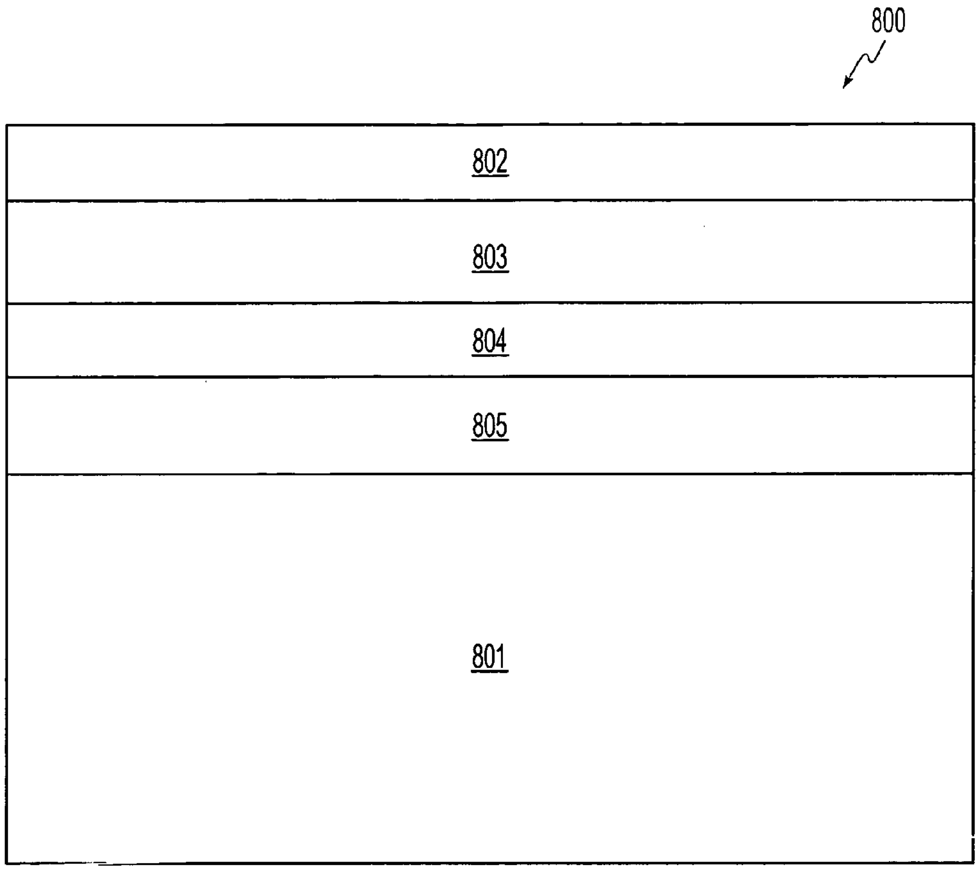
FIG. 8 shows an exemplary diagram of a DBR that includes two-pair Si—$SiO_2$ layers with layer thickness varied from $\lambda_0/4n$.
Figure 9:
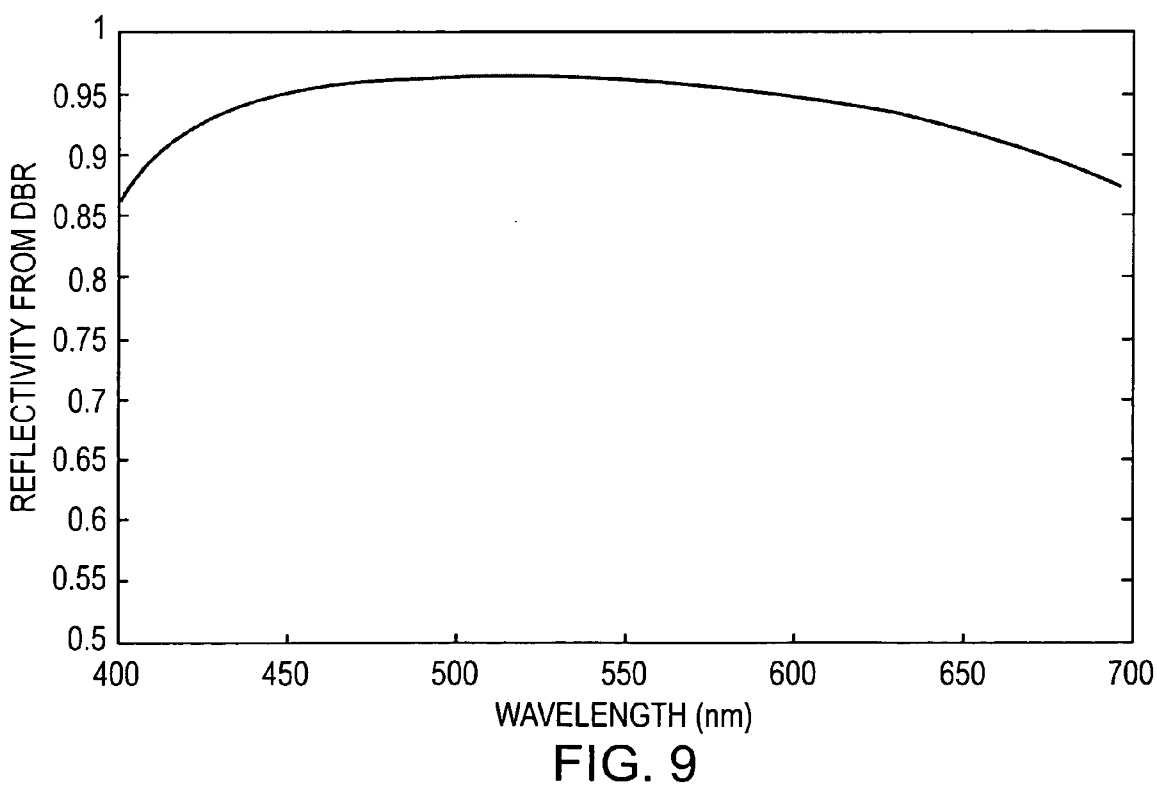
FIG. 9 shows an exemplary diagram of reflectivity results of the two-pair DBR in FIG. 8.

FIG. 8 is an exemplary diagram showing a DBR 800 that includes two-pair Si—$SiO_2$ layers with varied layer thickness, and uses multiple wavelengths not centered within the optical band of 400 nm-700 nm. The Si—$SiO_2$ layers 802-805 are formed on a substrate 801 using the refractive indices discussed in FIG. 7. However, by varying the thickness of the layers used in FIG. 7, the reflectance becomes more uniform. As shown in FIG. 8, (when $\lambda_a$=approximately 500 nm), the layer thickness of the Si layer 802 in the top pair may be formed to be 36.5±2 nm and the layer thickness of the $SiO_2$ layer 803 in the top pair may be formed to be 86.2±1 nm. The layer thickness of the Si layer 804 in the second pair (when $\lambda_a$=approximately 520 nm) may be formed to be 38.0±2 nm, and the layer thickness of the $SiO_2$ layer 805 in the second pair may be formed to be 89.7±1 nm. As a result, uniform reflectance of the two-pair DBR may be significantly improved throughout the optical band. FIG. 9 is an exemplary diagram showing the reflectivity results using the two-pair DBR shown in FIG. 8. As shown in FIG. 9, the reflectance is more uniform throughout the optical band than the reflectance in FIG. 7, and the unacceptable non-uniform reflectance near the 400 nm-450 nm band no longer exists.

Figure 10:
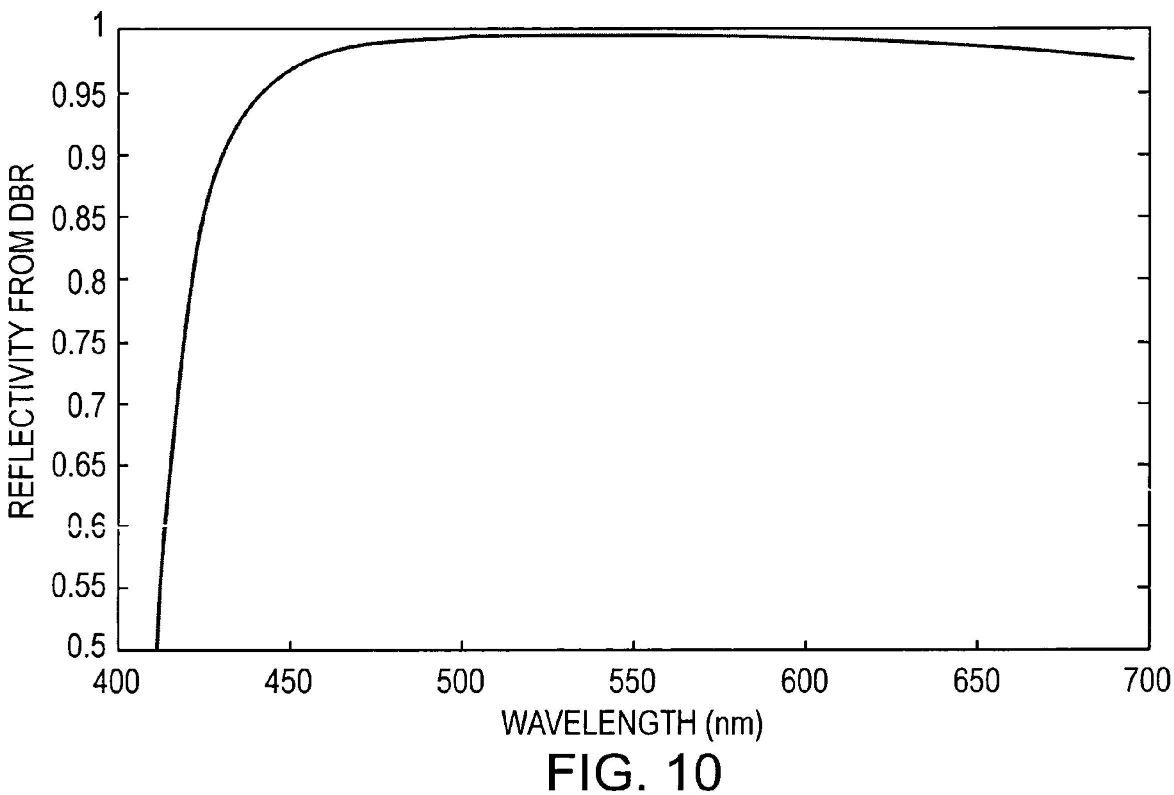
FIG. 10 shows an exemplary diagram of the reflectivity results when the DBR includes three-pair Si—$SiO_2$ layers with layer thickness determined by $\lambda_0/4n$.

FIG. 10 is an exemplary diagram showing the reflectivity results when the DBR includes three-pair Si—$SiO_2$ layers in accordance with Eq. (1) without varied layer thickness, and uses a centered wavelength $\lambda_0$=550 nm. Using the refractive index $n_i$ of 3.42 for Si and the refractive index $n_i$ of 1.45 for $SiO_2$, the three Si layers of the DBR are each 40.2 nm thick and the three $SiO_2$ layers of the DBR are each 94.8 nm thick. As a result, the reflectance shown in FIG. 10 is lower near 410 nm-450 nm, which is non-uniform and unacceptable. However, the thickness of the six layers of Si and $SiO_2$ may be altered to improve the uniformity of the reflectance throughout the optical band.

Figure 11:
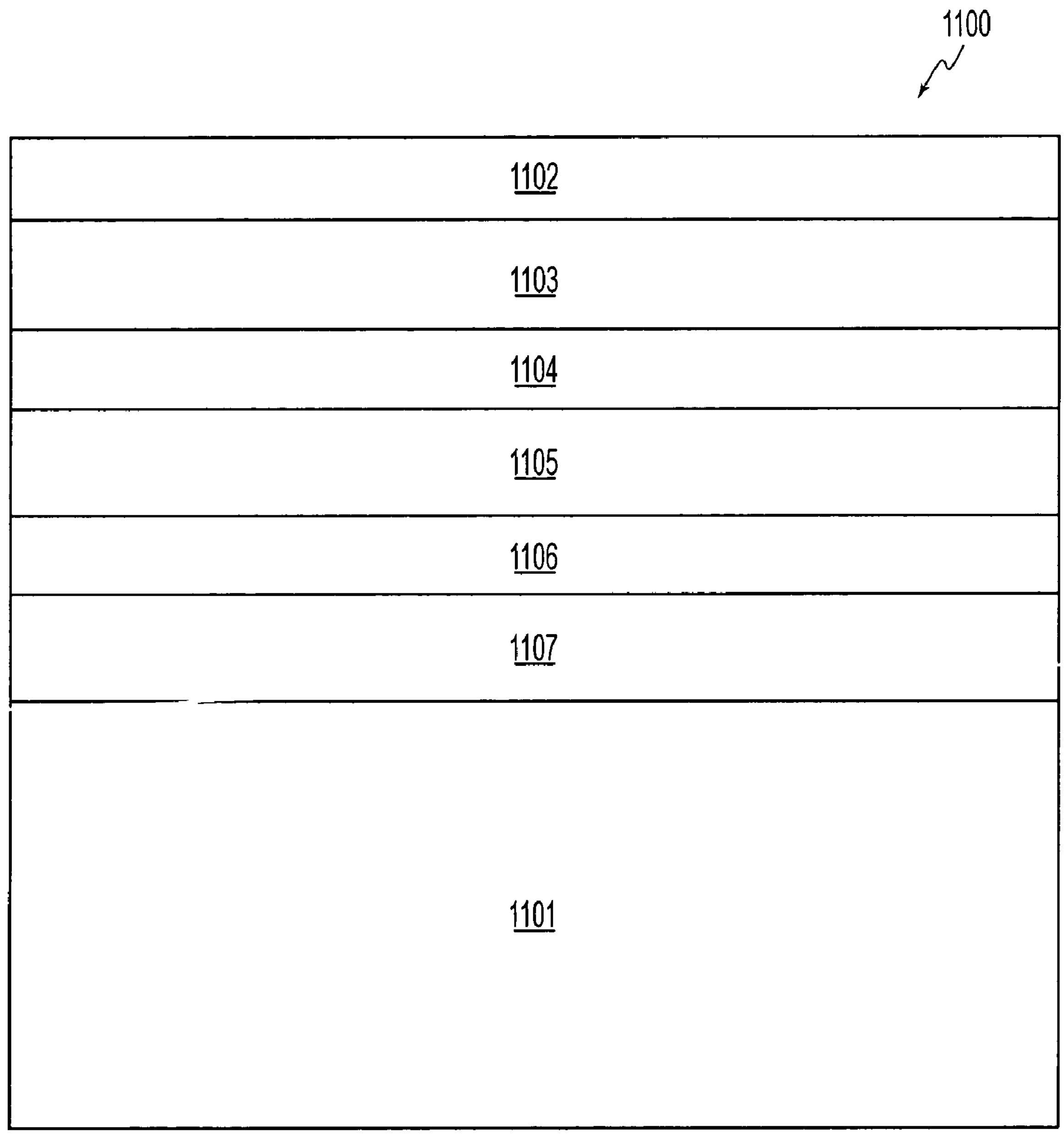
FIG. 11 shows an exemplary diagram of a DBR that includes three-pair Si—$SiO_2$ layers with layer thickness varied from $\lambda_0/4n$.
Figure 12:
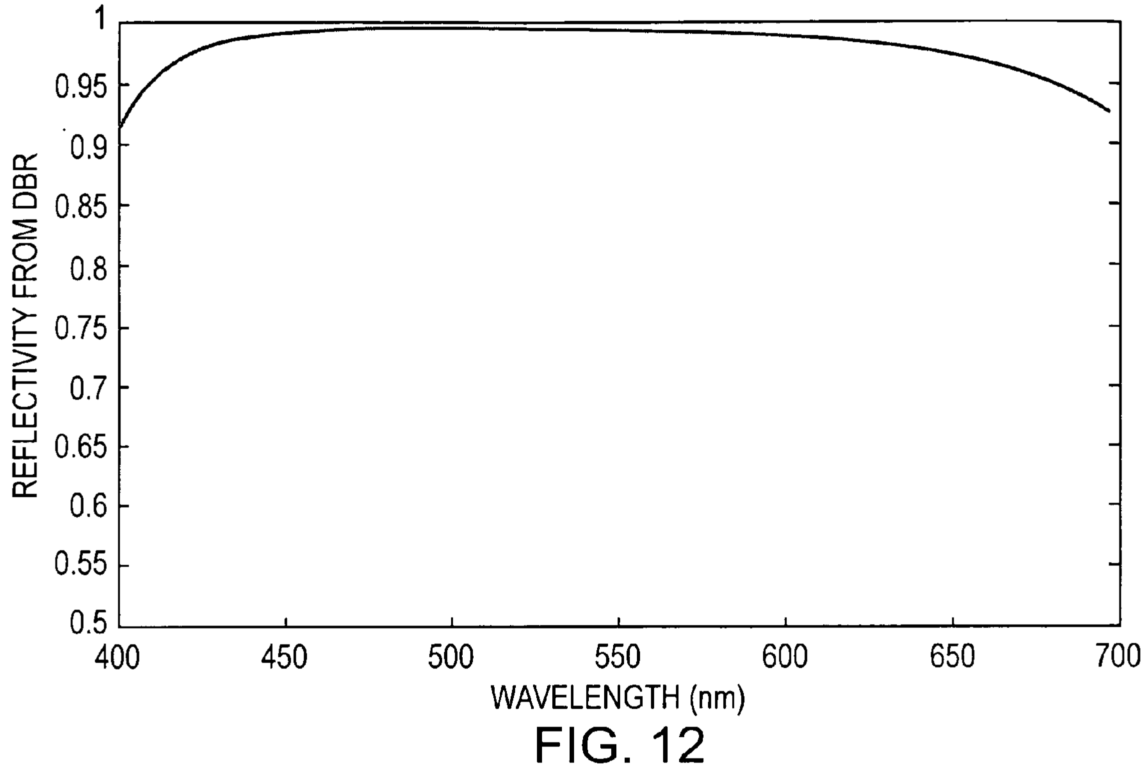
FIG. 12 shows an exemplary diagram of reflectivity results of the three-pair DBR in FIG. 11.

FIG. 11 is an exemplary diagram showing a DBR 1100 that includes three-pair Si—$SiO_2$ layers with varied layer thickness, and using multiple wavelengths not centered within the optical band of 400 nm-700 nm. As shown in FIG. 11, (when $\lambda_a$=approximately 500 nm), the Si layer 1102 in the top pair may be formed to be 36.5±2 nm thick and the $SiO_2$ layer 1103 in the top pair may be formed to be 86.2±1 nm thick. The Si layer 1104 in the second pair may be formed (when $\lambda_a$=approximately 510 nm) to be 37.3±2 nm thick, and the $SiO_2$ layer 1105 in the second pair may be formed to be 87.9±1 nm thick. The Si layer 1106 in the third pair may be formed (when $\lambda_a$=approximately 520 nm) to be 38.0±2 nm thick and the $SiO_2$ layer 1107 in the third pair may be formed to be 89.7±1 nm thick. As a result, uniform reflectance for the DBR is obtained throughout the optical band. FIG. 12 shows an exemplary diagram of the reflectivity results of the three-pair DBR shown in FIG. 11. As shown in FIG. 12, the reflectance is more uniform throughout the optical band than the reflectance in FIG. 9, and the unacceptable non-uniform reflectance near the 410 nm-450 nm band no longer exists.

As shown previously in FIG. 10 for a three-pair DBR formed only in accordance with Eq. (1), the reflectance is lower near 410 nm-450 nm, which is unacceptable. However, each pair of layers may be formed according to a wavelength selected based on different reflectance factors. For example, the layer thicknesses of the second pair of layers may be determined in accordance with Eq. (3), which is discussed below:

$$l_i=\lambda_1/4n_i \qquad \text{Eq. (3)}$$

where $\lambda_1$ is a wavelength with the lowest reflectivity over the desired optical band. The thicknesses of the first pair of layers may still be determined according to Eq. (1). The layer thickness of the third pair of layers may be determined in accordance with Eq (4), which is discussed below:

$$l_i=\lambda_2/4n_i \qquad \text{Eq. (4)}$$

where $\lambda_2$ is a wavelength with the lowest reflectivity over the optical band after the layer thicknesses of the second pair is adjusted according to Eq. (3). This method may be repeated for as many layers that are required in forming the DBR.

Figure 13:
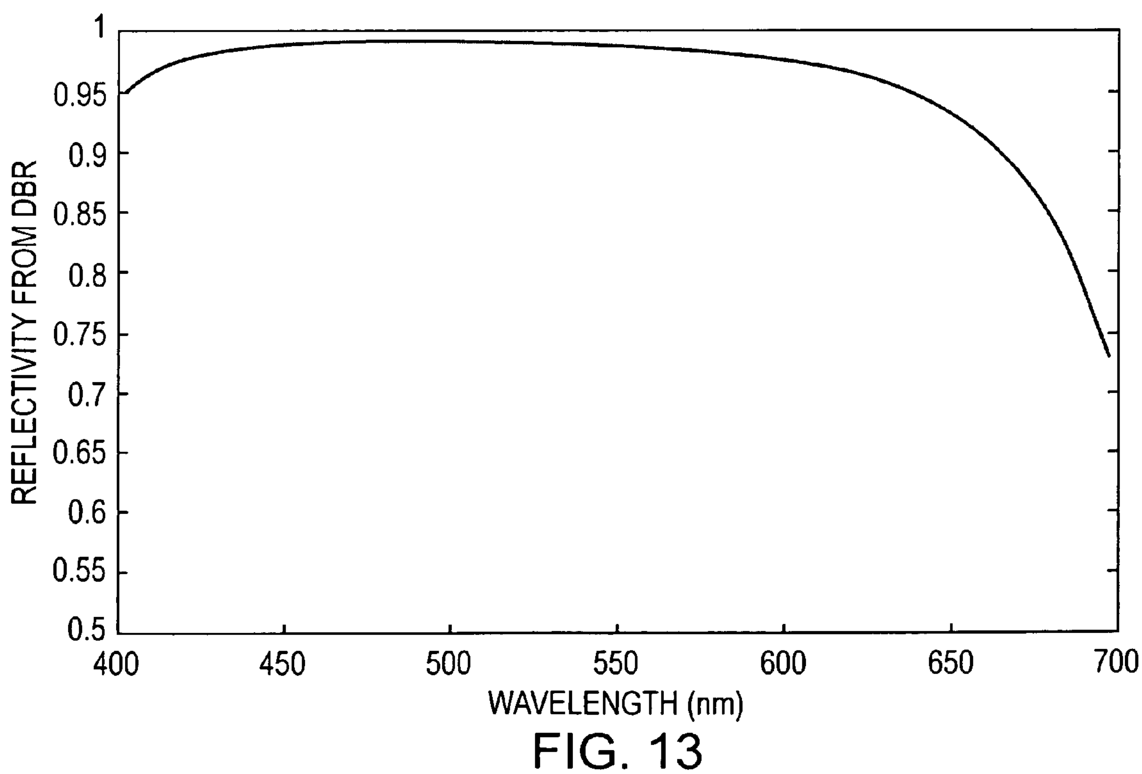
FIG. 13 shows an exemplary diagram showing reflectivity results when the layer thickness of each pair of layers is determined according to a wavelength selected based on different reflectance factors.
Figure 14:
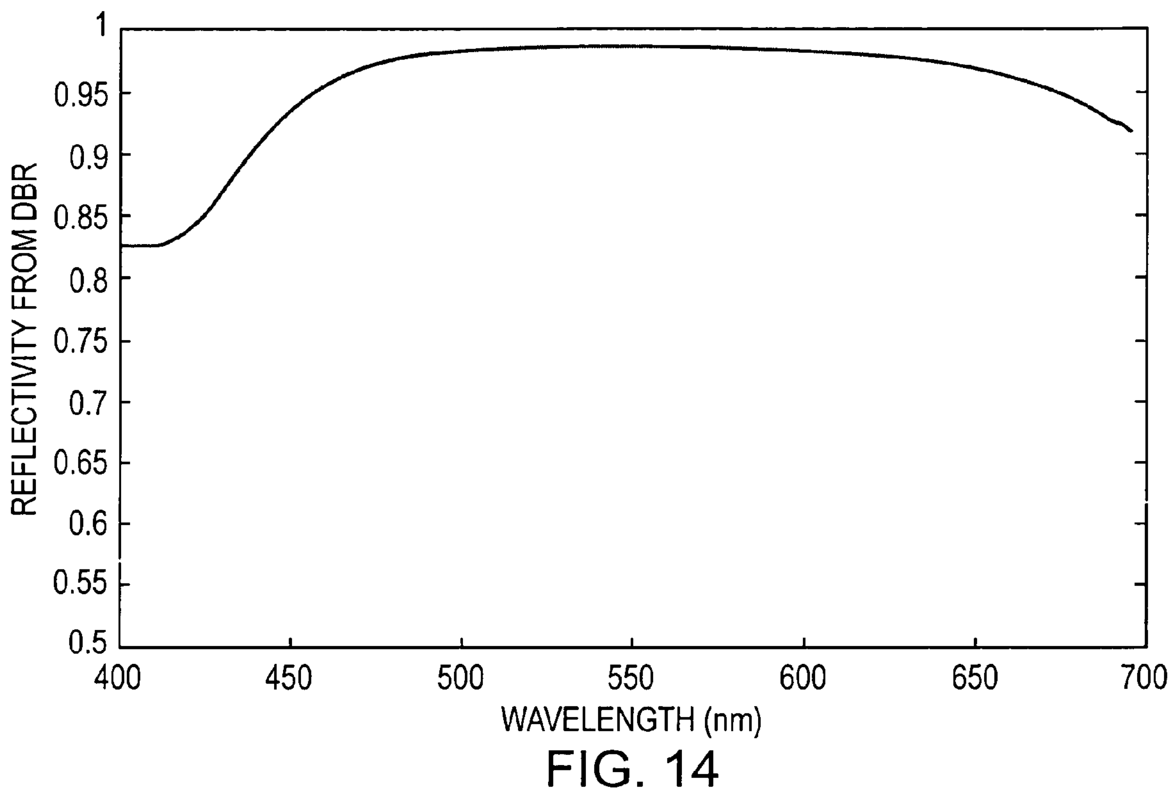
FIG. 14 is another exemplary diagram showing reflectivity results when the layer thickness of each pair of layers is determined according to a wavelength selected based on different reflectance factors.

FIG. 13 is an exemplary diagram showing reflectivity results when the layer thicknesses of the first and third pairs of layers are determined in accordance with Eq. (1), and the thicknesses of the second pair of layers are determined in accordance with Eq. (3). As shown in FIG. 13, the reflectance is much higher near 400 nm. Although a reduction in reflectance occurs above 650 nm, the overall reflectance is above 0.7 for the DBR. FIG. 14 is an exemplary diagram showing reflectivity results when the layer thicknesses of the first pair of layers are determined in accordance with Eq. (1), the thicknesses of the second pair of layers are determined in accordance with Eq. (3), and the thicknesses of the third pair of layers are determined in accordance with Eq. (4). As shown in FIG. 14, the reflectance of the DBR is much higher above 650 nm when compared to the DBR used in FIG. 13. Moreover, the overall reflectance in FIG. 14 remains significantly higher and is more uniform when compared to the overall reflectance in FIG. 13.

It will be appreciated that various of the above-disclosed and other features and functions, or alternatives thereof, may be desirably combined into many other different systems of applications. Also, various presently unforeseen or unanticipated alternatives, modifications, variations or improvements therein may be subsequently made by those skilled in the art which are also intended to be encompassed by the following claims.

What is claimed is:

1. A distributed Bragg reflector, comprising:
a first layer formed to be a first thickness; and
a second layer formed to be a second thickness,
wherein the first and second thicknesses are determined using a wavelength that is adjacent to a center wavelength of an optical band of the distributed Bragg reflector, so as to improve uniformity of reflectance of the distributed Bragg reflector throughout an optical band thereof.

2. The distributed Bragg reflector of claim 1, comprising a third layer formed to be a third thickness and a fourth layer formed to be a fourth thickness, the third and fourth thicknesses determined using a wavelength that is adjacent to the center wavelength of the optical band of the distributed Bragg reflector.

3. The distributed Bragg reflector of claim 2, comprising a fifth layer formed to be a fifth thickness and a sixth layer formed to be a sixth thickness, the fifth and sixth thicknesses determined using a wavelength that is adjacent to the center wavelength of the optical band of the distributed Bragg reflector.

4. The distributed Bragg reflector of claim 3, comprising the first, third and fifth layers formed of Si, the second, fourth and sixth layers formed of $SiO_2$, and the optical band of the distributed Bragg reflector being 400 nm-700 nm.

5. The distributed Bragg reflector of claim 4, comprising the thicknesses of the first, third and fifth layers formed of Si determined using a refractive index of the Si, and the thicknesses of the second, fourth and sixth layers formed of $SiO_2$ determined using a refractive index of $SiO_2$.

6. The distributed Bragg reflector of claim 2, comprising the first and second thicknesses of the first and second layers formed using a different adjacent wavelength than the third and fourth thicknesses of the third and fourth layers.

7. The distributed Bragg reflector of claim 3, comprising the fifth and sixth thicknesses of the fifth and sixth layers formed using a different adjacent wavelength than the first through fourth thicknesses of the first through fourth layers.

8. The distributed Bragg reflector of claim 7, comprising the adjacent wavelength used to form the first and second thicknesses being approximately 500 nm, the different adjacent wavelength used to form the third and fourth thicknesses being approximately 510 nm, and the different wavelength used to form the fifth and sixth thicknesses being approximately 520 nm.

9. The distributed Bragg reflector of claim 1, comprising the adjacent wavelength being between 500 nm and 520 nm.

10. A Xerographic device, comprising the distributed Bragg reflector of claim 1.

11. A method of forming a distributed Bragg reflector, comprising:

forming a first layer to be a first thickness; and forming a second layer to be a second thickness, wherein the first and second thicknesses are determined using a wavelength that is adjacent to a center wavelength of an optical band of the distributed Bragg reflector, so as to improve uniformity of reflectance of the distributed Bragg reflector throughout an optical band thereof.

12. The method of claim 11, comprising forming a third layer to be a third thickness and forming a fourth layer to be a fourth thickness, the third and fourth thicknesses determined using a wavelength that is adjacent to the center wavelength of the optical band of the distributed Bragg reflector.

13. The method of claim 12, comprising forming a fifth layer to be a fifth thickness and a sixth layer to be a sixth thickness, the fifth and sixth thicknesses determined using a wavelength that is adjacent to the center wavelength of the optical band of the distributed Bragg reflector.

14. The method of claim 13, comprising forming the first, third and fifth layers of Si and forming the second, fourth and sixth layers of $SiO_2$, and the optical band of the distributed Bragg reflector being 400 nm-700 nm.

15. The method of claim 14, comprising the thicknesses of the first, third and fifth layers formed of Si determined using a refractive index of the Si, and the thicknesses of the second, fourth and sixth layers formed of $SiO_2$ determined using a refractive index of $SiO_2$.

16. The method of claim 15, comprising forming the fifth and sixth thicknesses of the fifth and sixth layers using a different adjacent wavelength than the formation of the first through fourth thicknesses of the first through fourth layers.

17. The method of claim 16, comprising the adjacent wavelength used to form the first and second thicknesses being approximately 500 nm, the different adjacent wavelength used to form the third and fourth thicknesses being approximately 510 nm, and the different wavelength used to form the fifth and sixth thicknesses being approximately 520 nm.

18. The method of claim 12, comprising forming the first and second thicknesses of the first and second layers using a different adjacent wavelength than the formation of the third and fourth thicknesses of the third and fourth layers.

19. The method of claim 16, comprising determining the thicknesses $l_i$ of the first and second layers using $l_i=\lambda_a/4n_i$, the thicknesses $l_i$ of the third and fourth layers using $l_i=\lambda_1/4n_i$, and the thicknesses $l_i$ of the fifth and sixth layers using $l_i=\lambda_2/4n_i$, wherein $\lambda_a$ is the adjacent wavelength to the center wavelength of the optical band to the DBR, $\lambda_1$ is a wavelength with a lowest reflectance over the optical band, $\lambda_2$ is a wavelength with a next lowest reflectance over the optical band after the of the third and fourth layers are determined, and $n_i$ is the refractive index.

20. The method of claim 11, comprising forming the first layer of polysilicon and forming the second layer of silicon nitride $Si_3N_4$, the adjacent wavelength being between 500 nm and 520 nm.

* * * * *